(12) United States Patent
Pramanick et al.

(10) Patent No.: US 6,658,587 B1
(45) Date of Patent: Dec. 2, 2003

(54) EMULATION OF PERSISTENT GROUP RESERVATIONS

(75) Inventors: Ira Pramanick, San Jose, CA (US); Declan J. Murphy, San Francisco, CA (US); Krishna K. Kumar, Cupertino, CA (US); Siamak Nazari, Arcadia, CA (US); Andrew L. Hisgen, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/480,329

(22) Filed: Jan. 10, 2000

(51) Int. Cl.[7] .................................................. G06F 11/00
(52) U.S. Cl. .......................................... 714/5; 709/230
(58) Field of Search ............................. 714/5, 6, 13, 25, 714/29, 31, 42, 43, 28; 710/105, 107; 709/105, 230, 213, 201

(56) References Cited

U.S. PATENT DOCUMENTS

| | | | |
|---|---|---|---|
| 5,283,783 A | | 2/1994 | Nguyen et al. |
| 5,459,857 A | * | 10/1995 | Ludlam et al. ......... 395/182.04 |
| 5,687,308 A | | 11/1997 | Jardine et al. |
| 5,790,772 A | | 8/1998 | Badovinatz et al. |
| 5,822,531 A | | 10/1998 | Gorczyca et al. |
| 5,890,014 A | * | 3/1999 | Long ............................ 395/828 |
| 5,909,540 A | | 6/1999 | Carter et al. |
| 5,964,838 A | | 10/1999 | Cheung et al. |
| 5,964,886 A | | 10/1999 | Slaughter et al. |
| 5,991,518 A | | 11/1999 | Jardine et al. |
| 5,996,001 A | | 11/1999 | Quarles et al. |
| 6,002,851 A | | 12/1999 | Basavaiah et al. |
| 6,108,699 A | | 8/2000 | Moiin |
| 6,192,483 B1 | * | 2/2001 | Moiin et al. .................... 714/4 |
| 6,219,786 B1 | * | 4/2001 | Cunningham et al. ....... 713/152 |
| 6,304,980 B1 | * | 10/2001 | Beardsley et al. ............. 714/6 |
| 6,363,495 B1 | | 3/2002 | MacKenzie et al. |
| 6,438,705 B1 | | 8/2002 | Chao et al. |

OTHER PUBLICATIONS

Preslan et al., "Device Locks: Mutual Exclusion for Storage Area Networks," Mar. 15, 1999, IEEE.
Soltis et al., "The Design and Performance of a Shared Disk File System for IRIX," Mar. 23, 1998, Sixth NASA Goddard Space Center Conference on Mass Storage and Technologies.

(List continued on next page.)

Primary Examiner—Nadeem Iqbal
(74) Attorney, Agent, or Firm—Beyer Weaver & Thomas, LLP

(57) ABSTRACT

Method for emulating persistent group reservations on non persistent group reservation-compliant devices, apparatus to perform the method, and computer-readable storage medium containing instructions to perform the method. The present invention enables the emulation of persistent group reservations on a non persistent group reservation-compliant device, including a shared disk, to enable the disk's implementation of persistent group reservation-reliant algorithms. This in turn enables the implementation of algorithms based on persistent group reservation features substantially without modification of those algorithms. One such algorithm is a quorum algorithm. One example of persistent group reservations is found in the SCSI-3 standard. The present invention accomplishes persistent group reservation emulation, or PGRE, by storing host- and reservation-specific information on a reserved portion of the disk and using this data to emulate the steps of certain persistent group reservation features. One persistent group reservation preempt feature executes a set of steps as a single atomic action, the mutual exclusion necessary for this feature being done internally by the persistent group reservations-compliant device. To emulate this feature, the present invention uses mutual exclusion algorithm, where the disk serves as the "shared memory" of the algorithm. The variables needed by the algorithm are also stored in the reserved portion of the disk.

33 Claims, 6 Drawing Sheets

OTHER PUBLICATIONS

Scheible, Information Technology, Serial Storage Architecture–SCSI–3 Protocol (SSA–S3P),38 Rev. 5b, Apr. 1997.

VanHalderen et al., "Hierarchical resource management in the Polder metacomputing Initiative", (11/98) Parallel Computing, NL/Elsevier Science Publ., Amsterdam. vol. 24, No. 12–13, pp. 1807–1825.

Chang et al., "An ordered and reliable broadcast protocol for distributed systems", (7/97) Computer Comm., NL/Elsevier Science Publ., Amsterdam, vol. 20, No. 6, pp. 487–499.

Lamport, "A New Solution of Dijkstra's Concurrent Programming Problem," Aug. 1974, Communications of the ACM, vol. 17, No. 8, pp. 453–455.

* cited by examiner

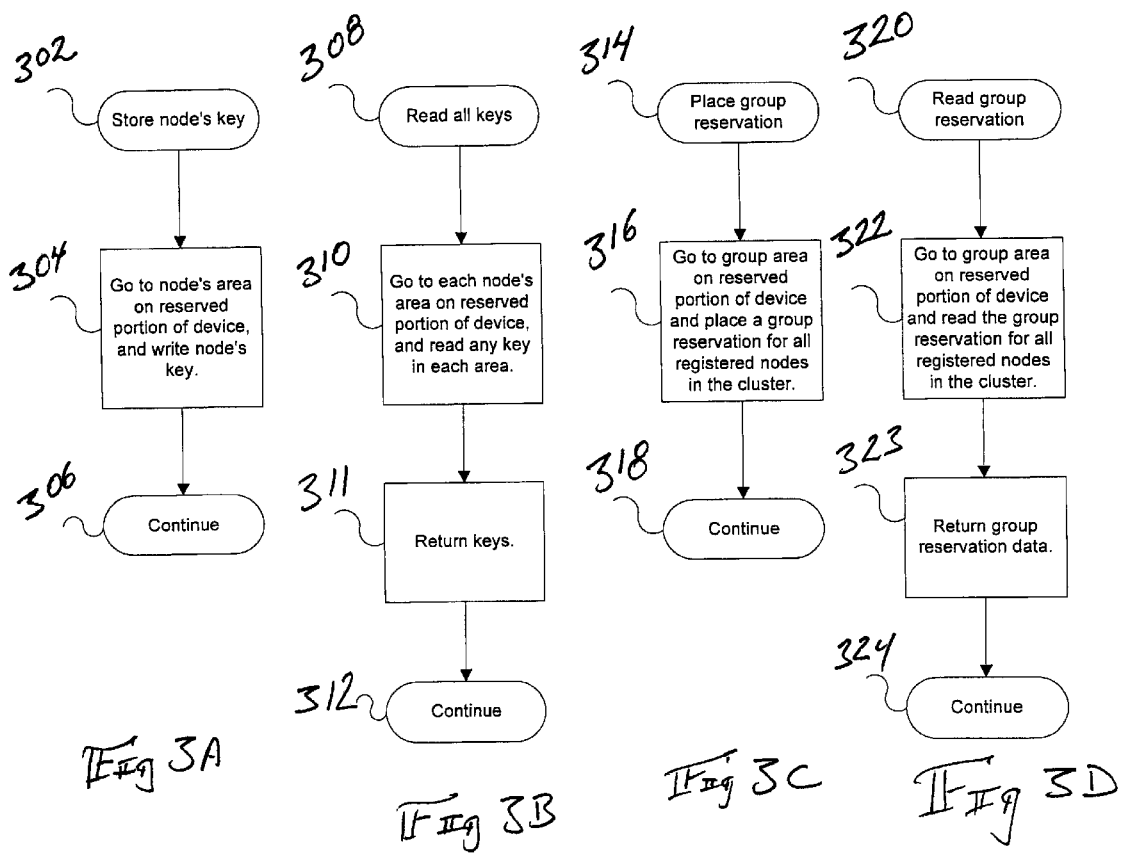

EMULATION OF PERSISTENT GROUP RESERVATIONS

CROSS-REFERENCE TO RELATED APPLICATIONS

This application is related to the following applications, filed concurrently herewith, and incorporated herein by reference:

(1) U.S. patent application Ser. No. 09/480,785, (Att. Dkt. No. SUN1P388/P4541, entitled "METHOD AND APPARATUS FOR MANAGING OPERATIONS OF CLUSTERED COMPUTER SYSTEMS";

(2) U.S. patent application Ser. No. 09/480,466, (Att. Dkt. No. SUN1P389/P4542, entitled "METHOD AND APPARATUS FOR DYNAMICALLY ALTERING CONFIGURATIONS OF CLUSTERED COMPUTER SYSTEMS";

(3) U.S. patent application Ser. No. 09/479,485, (Att. Dkt. No. SUN1P390/P4543, entitled "CONTROLLED TAKE OVER OF SERVICES BY REMAINING NODES OF CLUSTERED COMPUTING SYSTEM"; and (4) U.S. patent application Ser. No. 09/479,468, (Att. Dkt. No. SUN1P391/P4544, entitled "METHOD AND APPARATUS FOR RESOLVING PARTIAL CONNECTIVITY IN A CLUSTERED COMPUTING SYSTEM".

BACKGROUND OF THE INVENTION

1. Field of the Invention

The present invention relates generally to distributed computer systems, and more particularly to a system and method that enables the emulation of Persistent Group Reservations, or PGRs, on non-PGR compliant shared disks to enable the disk's utilization in a system which implements a PGR-reliant algorithm. One such algorithm enables a non-PGR compliant shared disk to be used as a quorum disk supporting highly available clustering software.

2. Related Art

As computer networks are increasingly used to link computer systems together, distributed operating systems have been developed to control interactions between computer systems across a computer network. Some distributed operating systems allow client computer systems to access resources on server computer systems. For example, a client computer system may be able to access information contained in a database on a server computer system. When the server fails, it is desirable for the distributed operating system to automatically recover from this failure. Distributed computer systems with distributed operating systems possessing an ability to recover from such server failures are referred to as "highly available" systems. High availability is provided by a number of commercially available products including Sun™ Cluster from Sun™ Microsystems, Palo Alto, Calif.

Distributed computing systems, such as clusters, may include two or more nodes, which may be employed to perform a computing task. Generally speaking, a node is a group of circuitry designed to perform one or more computing tasks. A node may include one or more processors, a memory and interface circuitry. Generally speaking, a cluster is a group of two or more nodes that have the capability of exchanging data between nodes. A particular computing task may be performed upon one node, while other nodes perform unrelated computing tasks. Alternatively, components of a particular computing task may be distributed among the nodes to decrease the time required to perform the computing task as a whole. Generally speaking, a processor is a device configured to perform an operation upon one or more operands to produce a result. The operations may be performed in response to instructions executed by the processor.

Nodes within a cluster may have one or more storage devices coupled to the nodes. Generally speaking, a storage device is a persistent device capable of storing large amounts of data. For example, a storage device may be a magnetic storage device such as a disk device, or optical storage device such as a compact disc device. Although a disk device is only one example of a storage device, the term "disk" may be used interchangeably with "storage device" throughout this specification. Nodes physically connected to a storage device may access the storage device directly. A storage device may be physically connected to one or more nodes of a cluster, but the storage device need not necessarily be physically connected to all the nodes of a cluster. The nodes that are not physically connected to a storage device may not access that storage device directly. In some clusters, a node not physically connected to a storage device may indirectly access the storage device via a data communication link connecting the nodes.

One of the aims of a highly available (HA) system is to minimize the impact of individual components' failures to system availability. An example of such a failure is a communications loss between some of the nodes of a distributed system. Referring down to FIG. 1, an exemplar cluster is illustrated. In this example, the cluster, 1, comprises four nodes, 102, 104, 106 and 108. The four nodes of the system share a disk, 110. In the exemplar herein presented, nodes 102 through 104 have access to disk 110 by means of paths 120 through 126, respectively. Accordingly, this exemplar disk can be said to be "4-ported". As previously discussed, access to disk 110 may be by means of physical connection, data communication link or other disk access methodologies well-known to those having ordinary skill in the art.

The nodes in the exemplar system are connected by means of data communication links 112, 114, 116 and 118. In the event that data communications links 112 and 114 fail, node 106 will no longer be capable of communication with the remaining nodes in the system. It will be appreciated from study of the figure however that node 106 retains its communications with shared disk 110 by means of path 124. This gives rise to a condition known as "split brain".

Split brain refers to a cluster breaking up into multiple sub-clusters, or to the formation of multiple sub-clusters without knowledge of one another. This problem occurs due to communication failures between the nodes in the cluster, and often results in data corruption. One methodology to ensure that a distributed system continues to operate with the greatest number of available resources, while excluding the potential for data corruption occasioned by split brain, is through the use of a quorum algorithm with a majority vote count. Majority vote count is achieved when a quorum algorithm detects a vote count greater than half the total number of votes. In a system with n nodes attached to the quorum device, each node is assigned one vote, and the system's quorum device is assigned n−1 votes, as will be later explained.

To explain how a majority vote count quorum algorithm operates, consider the four-node cluster illustrated in FIG. 1, and assume no votes are assigned to a quorum device.

Assume a communications failure occurs between node 106 and the other nodes in the cluster. Since each node has one vote, and nodes 102, 104 and 108 are operating properly and are in communication with one another, a simple quorum algorithm would count one vote for each of these devices, against one vote for node 106. Since 3>1, the subcluster comprising nodes 102, 104 and 108 attains majority vote count and this simplified quorum algorithm excludes node 106 from accessing shared disk 110.

The simplified example previously discussed becomes somewhat more complicated when equal numbers of nodes are separated from one another. Again considering the example shown in FIG. 1, consider the loss of communications links 114 and 118. In this case, nodes 102 and 108 are in communication with one another, as are nodes 104 and 106, but no communications exist between these pairs. In this example, communications are still intact between each of the nodes and shared disk 110. It will be appreciated however, that 2 is not greater than 2, and therefore neither subcluster attains majority vote count and this relatively simple quorum algorithm fails.

A quorum device, or QD, is a hardware device shared by two or more nodes within the cluster that contributes votes used to establish a quorum for the cluster to run. The cluster can operate only when a quorum of votes, i.e. a majority of votes as previously explained, is available. Quorum devices are commonly, but not necessarily, shared disks. Most majority vote count quorum algorithms assign the quorum device a number of votes which is one less than the number of connected quorum device ports. In the previously discussed example having a 4-node cluster having n=4, where each node is ported to the quorum device, that quorum device would be given n−1 or 3 votes, although other methods of assigning a number of votes to the quorum device may be used.

The pair of nodes within the cluster that, through the quorum algorithm, first take ownership of the disk cause the algorithm to exclude the other pair. In this example, the two nodes which first take ownership of disk 110 following the fractioning of the cluster, for instance a subcluster comprising nodes 102 and 108, cause the algorithm to exclude the other subcluster comprising nodes 104 and 106 from accessing the shared disk until the system can be restored. This is true since the vote count for the first two nodes accessing the disk plus the three votes for the quorum disk itself is greater than the vote count for the two nodes which later attempt to access the shared disk, or 2+3>2. A quorum device that allows one or more nodes to take ownership of the device and blocks out other nodes, as previously discussed, is sometimes referred to as a mutex, or mutual exclusion device.

Where a cluster comprises only two nodes, as shown in FIG. 2, a quorum device, such as shared disk 110, is absolutely necessary. This is true is because in the event of the failure of communications link 118, absent such a quorum device, neither node can ever achieve a majority, and hence is incapable of forming a valid cluster. Accordingly, if a cluster were implemented with only two nodes and no quorum device, it will be appreciated that the failure of either node will cause the system to fail.

SCSI, the Small Computer System Interface, is a set of evolving ANSI standard electronic interfaces that allow personal computers to communicate with peripheral hardware such as disk drives, tape drives, CD-ROM drives, printers, and scanners faster and more flexibly than previous interfaces. There are several versions of SCSI, and the older SCSI-2 standards are being replaced by the newer, more fully featured SCSI-3 standards.

The SCSI-3 standard adds two significant enhancements to the SCSI-2 standard that allows SCSI-3 disks to be used as convenient quorum devices. These features are referred to as the Persistent Group Reservation features, or PGRs, of SCSI-3. First, SCSI-3 allows a host node to make a disk reservation that is persistent across power failures and bus resets. Second, group reservations are permitted, allowing all nodes in a running cluster to have concurrent access to the disk while disallowing access to nodes not in the cluster. This persistence property allows SCSI-3 devices to be used as mutex, or mutual exclusion, devices, while the group reservation property allows the disk to be managed by volume managers. Accordingly, the quorum disk can be used for storing customer data. SCSI-3 PGRs are implemented in the device firmware.

The PGR quorum disk implementation provides five primitives to effect the quorum algorithm. They are:
1. Storing a node's reservation key on the device;
2. Reading all keys on the device;
3. Placing a group reservation for all registered nodes;
4. Reading the group reservation; and
5. Preempting the reservation key of another node.

PGRs utilize a 64-bit reservation key. At least one quorum algorithm has been implemented utilizing persistent group reservation, or PGR. PGR enables preempting and other operations that are required to ensure that only one cluster has access to a shared disk device in the case of split brain. While this implementation is perfectly acceptable for clusters utilizing later SCSI-3 devices, PGR is not implemented on some earlier SCSI-3 devices, or on any SCSI-2 devices. Accordingly, algorithms utilizing PGR features, including the previously discussed quorum algorithms, are currently inoperable with these older device types.

The implementation of any algorithm relying on PGR features, again including quorum algorithms, is readily attainable for systems implementing full-featured SCSI-3 quorum devices, or later versions of those devices. However, such algorithm implementation requires that owners of systems utilizing earlier drive types would, of necessity, be required to upgrade all their shared storage devices to devices implementing the newer standard. This of course presents significant cost and service interruption issues for users of clustered systems. The current alternative is to forego the high availability features of clustering which, in many cases, were the deciding features for users to implement clustered systems.

What is needed then is a methodology which at once enables users of non-PGR devices to implement algorithms, including quorum algorithms, that rely on PGR features, for instance SCSI-3 PGR features. What would be even more useful would be a methodology that would not require new algorithms, or require significant re-programming of the software implementing algorithms which rely on PGR features.

BRIEF SUMMARY OF THE INVENTION

The present invention enables the emulation of PGRs on non-PGR compliant shared disks to enable the users of non-PGR to implement algorithms, including quorum algorithms, based on PGR features. This in turn enables the implementation of algorithms, including quorum algorithms, based on PGRs substantially without major re-writing of the software which implements those algorithms. Where PGRs are implemented in the device firmware, the present invention emulates these PGRs by writing emulation data that emulates those PGRs on a portion of the device itself. In the case where the device is a magnetically recordable device, for instance a hard disk, this emulation data is written to a portion of the recordable media itself. It will be appreciated by those having skill in the art that while the discussion of the features and advantages of the invention taught herein centers on various magnetically recordable and readable devices, these features and advantages are applicable to a wide range of data storage and memory devices. By way of illustration but not limitation, such devices include: semiconductor memory devices such a Flash memory, RAM, ROM, EEPROM and the like; magnetic storage devices including magnetic core memory devices, magnetic tape, floppy disks, hard disks, ZIP™ drives and the like; optical storage devices including CD-ROM, DVD and the like, and mechanical storage devices including Hollerith cards, punched paper tape and the like. The present invention specifically contemplates all such implementations.

To effect this emulation, each host node stores certain host-specific information on its portion of the disk. Additionally, certain group reservation information is also stored on a separate portion of the disk. The present invention accomplishes PGR emulation, or PGRE, by storing this host- and reservation-specific information on a reserved portion of the disk and using this data to emulate the steps of certain PGR primitives.

It will be recalled that the PGRs implementing a quorum disk provide five primitives to effect the quorum algorithm. These include storing a node's reservation key on the device, reading all keys on the device, preempting the reservation key of another node, placing a group reservation for all registered nodes, and reading the group reservation information.

PGREs emulating the storing and reading of reservation keys, as well as the placing and reading of group reservations, are effected by reading and/or writing the required information from and/or to the disk itself. The emulation of the PGR primitive whereby one subcluster preempts the placement, by another subcluster, of the other subcluster's reservation key on the device is less straightforward.

The PGR preempt primitive executes a set of steps as a single atomic action, the mutual exclusion necessary for this primitive being done internally by the device. To emulate this primitive, the present invention uses a mutual exclusion algorithm. One embodiment utilizes a novel mutual exclusion algorithm suggested by Lamport's algorithm, where the disk serves in place of the "shared memory" taught by Lamport. The variables needed by the novel mutual exclusion algorithm taught herein are also stored in the reserved portion of the disk previously discussed.

It should be noted that, while the previously presented background discussion focused on some of the problems attendant upon nodes within a distributed system, the principles of the present invention are not limited in applicability to such nodes or workstations. The principles enumerated herein are capable of implementation to solve a wide variety of computational problems, and the present invention specifically contemplates all such implementations.

These and other advantages of the present invention will become apparent upon reading the following detailed descriptions and studying the various figures of the Drawing.

BRIEF DESCRIPTION OF THE DRAWING

For more complete understanding of the present invention, reference is made to the accompanying Drawing in the following Detailed Description of the Invention. In the drawing:

FIGS. 3a–3e are flow chart representations of the PGREs for the writing of a node's key, the reading of all nodes'keys, the placement and reading of group reservation keys, and the preempting by one node of other's keys, respectively.

Figure 1:
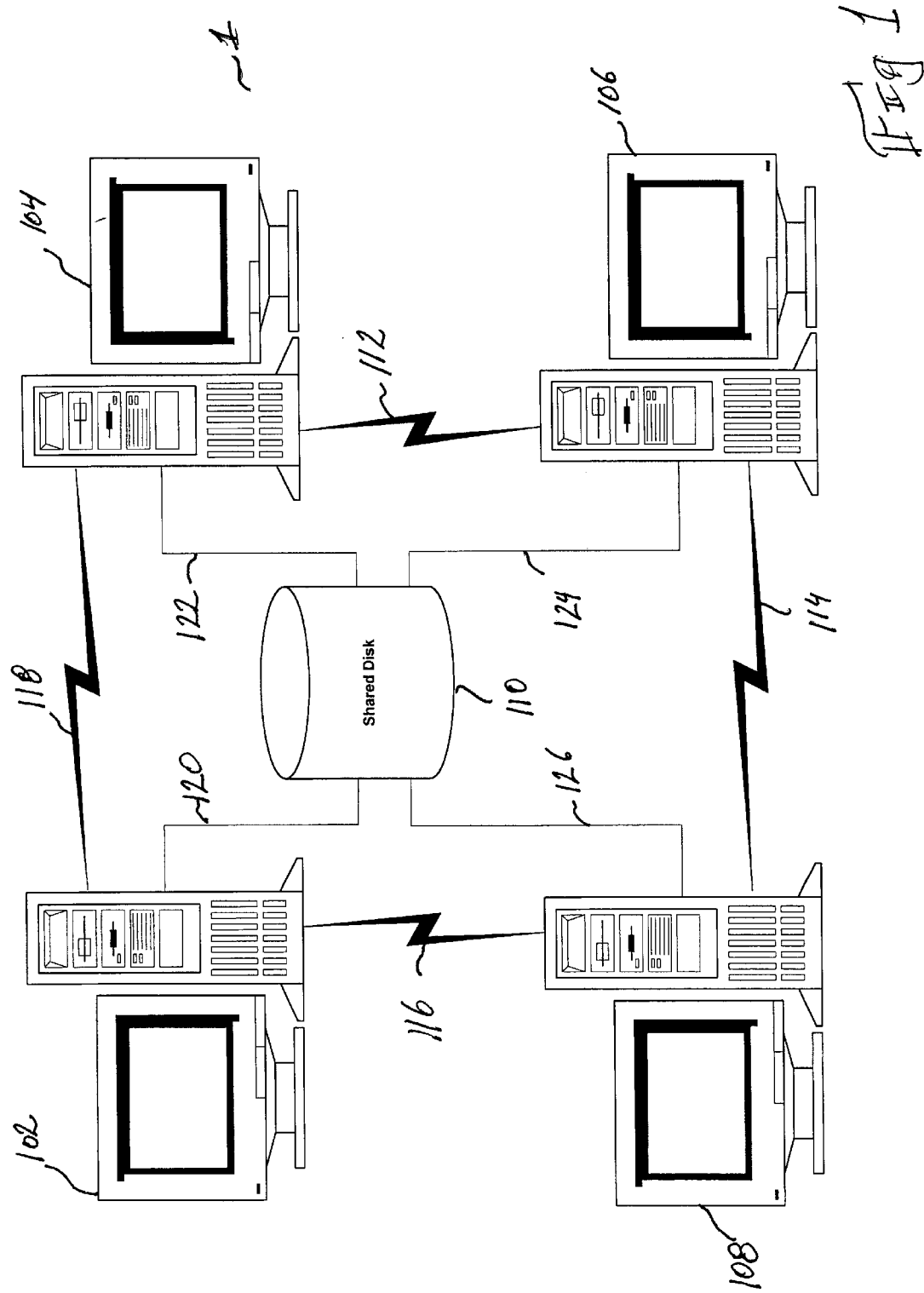
FIG. 1 is a prior art representation of a four-node cluster.
Figure 2:
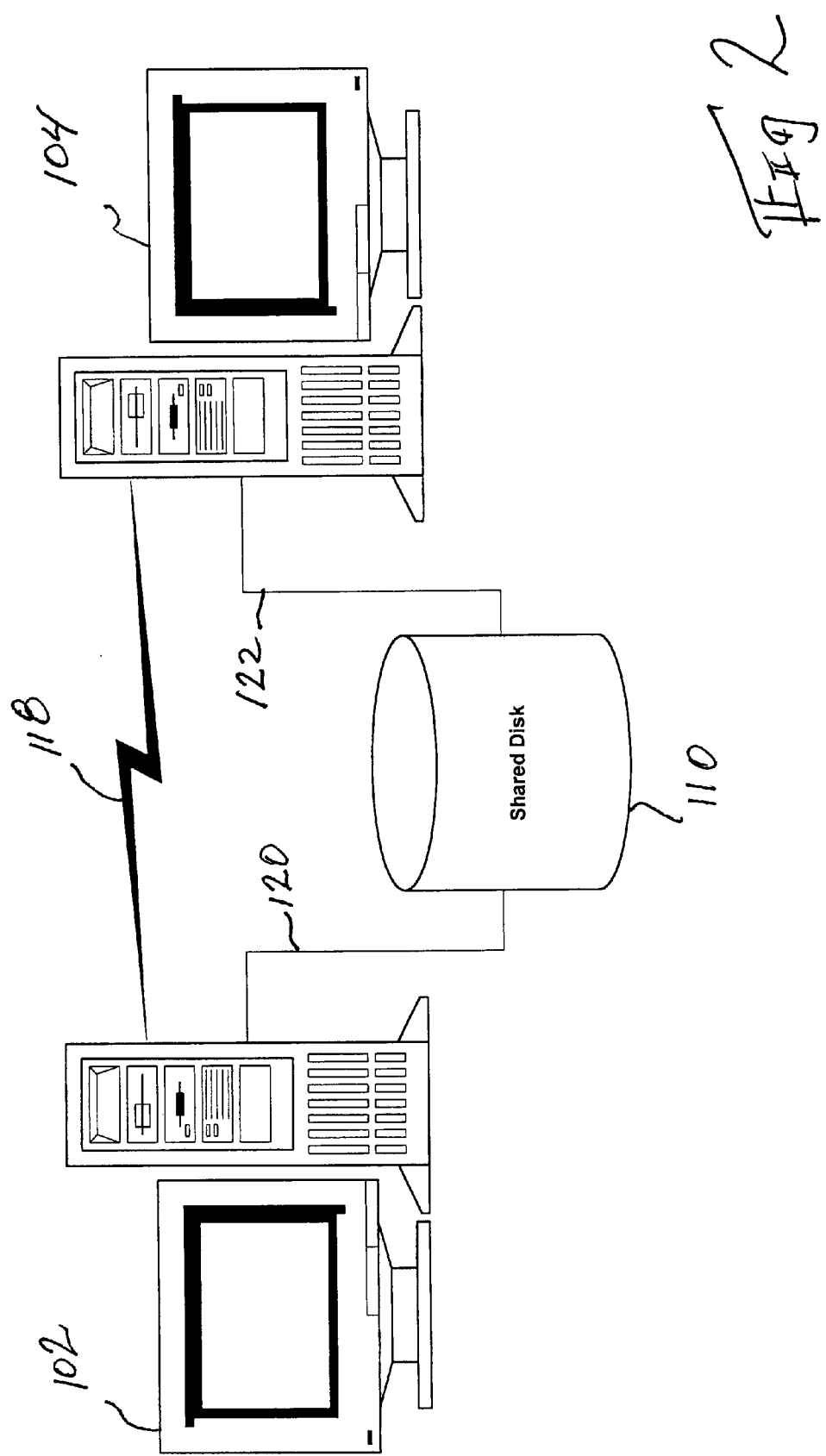
FIG. 2 is a prior art representation of a two-node cluster.

Reference numbers refer to the same or equivalent parts of the invention throughout the several figures of the Drawing.

DETAILED DESCRIPTION OF THE INVENTION

Persistent Group Reservation Emulation is based on the storage, reading, and preemption of reservation keys on a reserved area of the quorum device itself. This is in contrast to persistent group reservations, or PGRs, which are implemented in the device firmware. PGRs are implemented, inter alia, in the emerging SCSI-3 standard. In order to emulate PGR primitives, the present invention teaches the reading and writing of reservation keys and group reservations on a reserved portion of a non-PGR compliant device. This is in contradistinction to PGR-compliant devices, including but not necessarily limited to full-featured SCSI-3 devices, where the PGRs are written to, and read from, the device firmware.

The present invention further teaches a novel emulation of the PGR preempt primitive, which employs a novel mutual exclusion algorithm to preclude the previously discussed split brain problem.

Many operating systems reserve certain physical locations on hard drives for system purposes. One example of such reserved space is found on disks which are utilized by Sun™ Microsystems' Solaris™ Operating System, which reserves two cylinders for the storage of private operating system information. Since the size of the cylinders is dependent on the size of the disk, there is ample unused space in the reserved area for implementing PGREs.

It will be recalled that SCSI-3 PGRs utilize a 64-bit reservation key, and such a key structure is also contemplated in the implementation of this embodiment of the present invention incorporating PGREs. Alternative key structures, including different bit counts are specifically contemplated by the teachings of the present invention.

It will further be recalled that the SCSI-3 quorum disk implementation provides five primitives to effect the quorum algorithm. These primitives include: storing a node's reservation key on the device, reading all keys on the device, preempting the reservation key of another node, placing a group reservation for all registered nodes, and reading the group reservation information.

Four of the five PGREs which emulate their respective PGRs present no particular synchronization difficulties, and are illustrated having reference to FIGS. 3a–3d.

Referring now to FIG. 3a, the PGRE that emulates the PGR storage primitive is explained. When software implementing an algorithm requires, at 302, the storage of a node's registration key, the software is directed, at 304, to go to that node's area on the reserved portion of the device, and write the node's registration key thereon. The node is then said to be registered. Thereafter, at 306, execution of the software continues.

The PGRE emulating the PGR that reads all nodes'keys is explained at FIG. 3b. When software implementing an algorithm requires, at 308, the reading of all nodes' keys, the PGRE, at 310, goes to each individual node's area on the device and reads the key written thereon. At 311, the PGRE returns the values for the keys read. Thereafter, at 312, execution of the software continues.

Referring now to FIG. 3c, the PGRE which emulates the PGR group reservation placement primitive is explained. When software implementing an algorithm requires, at 314, the placing of a group reservation for all registered nodes, at 316 the PGRE goes to the group area on the reserved portion of the device and places a group reservation for all nodes registered in the cluster. A node is said to be registered when its registration key has been placed on the device, as discussed above. Thereafter, at 318, execution of the software continues.

Having reference now to FIG. 3d, the PGRE which emulates the PGR group reservation reading primitive is explained. When software implementing an algorithm requires, at 320, the reading of group reservation information, at 322 the PGRE goes to the group area on the reserved portion of the device and reads the group reservation for all nodes registered in the cluster. At 323 the PGRE returns the group reservation data. Thereafter, at 324, execution of the software continues.

Where split brain occurs after a cluster has been implemented and initialized, to preclude data corruption it is necessary for one subcluster to attain ownership of the shared device, and to exclude other subclusters from accessing the device. Accordingly, what is needed is a methodology to preempt those other clusters from accessing the device until normal system operations can be restored. One methodology to attain this preemption is through the use of the PGR preempt primitive.

The implementation of PGREs emulating PGRs which read and write node keys and group reservation data, as explained above, require no particular special synchronization effort. The implementation, however, of the PGRE emulating the PGR preempt primitive requires atomicity of a set of read/write operations on the disk. An instruction may be said to do several things "atomically", i.e. all the things are done immediately, and there is no chance of the instruction being half-completed or of another being interspersed. Again, where the SCSI-3 implementation of this feature is effected in the device firmware, for the PGRE implementation of this primitive in a SCSI-2 disk, the primitive is be implemented in the clustering software itself.

An exemplar algorithm for implementing a PGRE preempt primitive is given as:

```
int preempt(mykey, victim_key) {
   if(!(key_present(mykey))
      return (failure);
   remove(victim_key);
   return (success);
}
```

In order to realize this preempting of the reservation of one node by another node, a mutual exclusion functions must be implemented. One mutual exclusion methodology was proposed by Leslie Lamport, in an article entitled *A New Solution of Dijkstra's Concurrent Programming Problem*, published in the August 1974 Communications of the ACM. This methodology, referred to hereinafter as Lamport's algorithm, enables multiple computers owning a shared disk to achieve mutual exclusion.

The mutual exclusion algorithm taught by Lamport in the previously cited reference is:

```
begin integer j;
   L1:
      choosing [i]:=1;
      number [i]:=1+maximum (number[1], . . . , number
         [N];
      choosing [i]:=0;
      for j=1 step 1 until N do begin
         L2: if choosing [j]≠0 then goto L2;
         L3: if number [j]≠0 and (number [j], j)<(number [i],
            i) then goto L3;
         end
      critical section;
      number [i]:=0;
      noncritical section;
      goto L1;
   end
```

In implementing this algorithm, it will be noted that the principles of the present invention teach storing the variables choosing [i] and number [i] on the device itself. Moreover, the critical section of this algorithm is the PGRE primitive algorithm, previously discussed.

The fact that this algorithm is directed to memory, such as RAM, as opposed to disk storage devices presents a problem, however. Lamport's algorithm is based on the correct assumption that if a computer fails, its memory eventually returns to zero. In the case of disk drives, this is not a valid assumption. If a computer halts execution, and it consequently fails to clear a portion of a disk, the data in this portion of the disk, which may have been written to, cannot be assumed to be zero. This is so because the writing on a computer disk is generally persistent, unless specifically erased or overwritten. The converse is not true for semiconductor memory which, once powered down, returns to the zero state at power down or is specifically erased once it is powered back up. Accordingly, a mutual exclusion algorithm such Lamport's algorithm, originally applied to a non-persistent storage device, such as RAM, is not suitable to reliably provide mutual exclusion for a preempt function which, like the present invention, is implemented on a persistent storage device such as a hard drive.

Since the correct values of at least some of the variables detailed above are crucial to the correct functioning of the algorithm, the fact that data stored in a critical part of the disk could have an indeterminate state, or non-zero values, would have the effect of blocking any other node from ever entering the critical section. What is needed is a modification to Lamport's algorithm to ensure that the failure or re-setting of one node in the system does not cause the other nodes of the system to be locked out of the critical section of the disk.

In order to account for node i dying with choosing [i] and number [i] set to non-zero values, the present invention teaches a first modification to Lamport's algorithm. At steps L2 and L3 of Lamport's algorithm, as amended in accordance with the herein, a node can ignore choosing [i] and number [i] if node i does not have its key on the disk. This manages situations where node i was successfully preempted, by node j, and dies before leaving its critical section.

A second modification to Lamport's algorithm is at the step "goto L1". In the original version, this step causes execution to loop back and recalculate new values for choosing [i] and number [i]. Because this loop back is not required for a single execution of a preempt, this step is deleted in the modifications to Lamport's algorithm taught herein.

While the preceding discussion has centered on the novel improvements required to make Lamport's mutual exclusion algorithm suitable for use on persistent storage devices, study of the principles enumerated herein will render apparent to those having skill in the art that alternative mutual exclusion algorithms may, with equal facility, be employed in implementing the present invention. The principles of the present inventions specifically contemplate all such alternative mutual exclusion algorithms and methodologies.

Figure 3E:
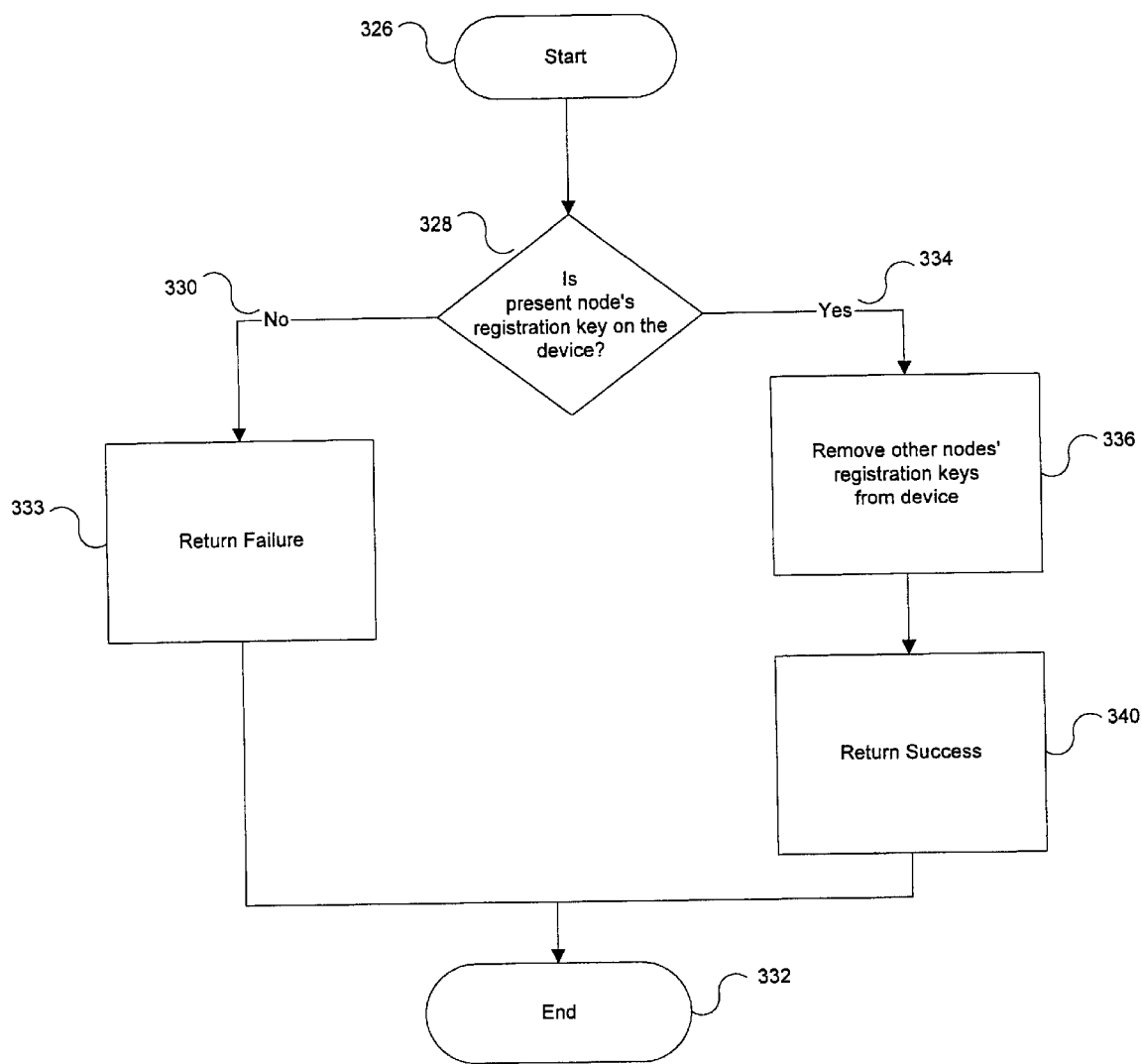

With reference now to FIG. 3e, the operation of the preempt PGRE primitive is discussed. At 326 the preempt primitive is initiated. At 328 a determination is made whether the present node's registration key has been written to the device. If, at 330 the determination has been made that the present nodes registration key is not on the device, failure is returned at 333 and the preempt is terminated at 332. If at 334, a determination is made that the present node's registration key has been written to the device, the registration keys of any other nodes are removed from the device at 336. This effectively locks other nodes from subsequent preempts. Thereafter, at 340, the primitive returns success, and the preempt is terminated at 332.

One embodiment of the present invention enables the emulation of SCSI-3 PGRs on a dual-ported non-PGR compliant shared disk. This embodiment implements Persistent Group Reservation Emulations, or PGREs, on quorum devices for any cluster where the quorum devices thereof are not greater than 2-ported. Although the present invention may be practiced on a wide variety of clustered or distributed systems, the exemplar of this embodiment discussed below implements a dual-ported SCSI-2 disk as a quorum device in a two-node cluster.

Figure 4:
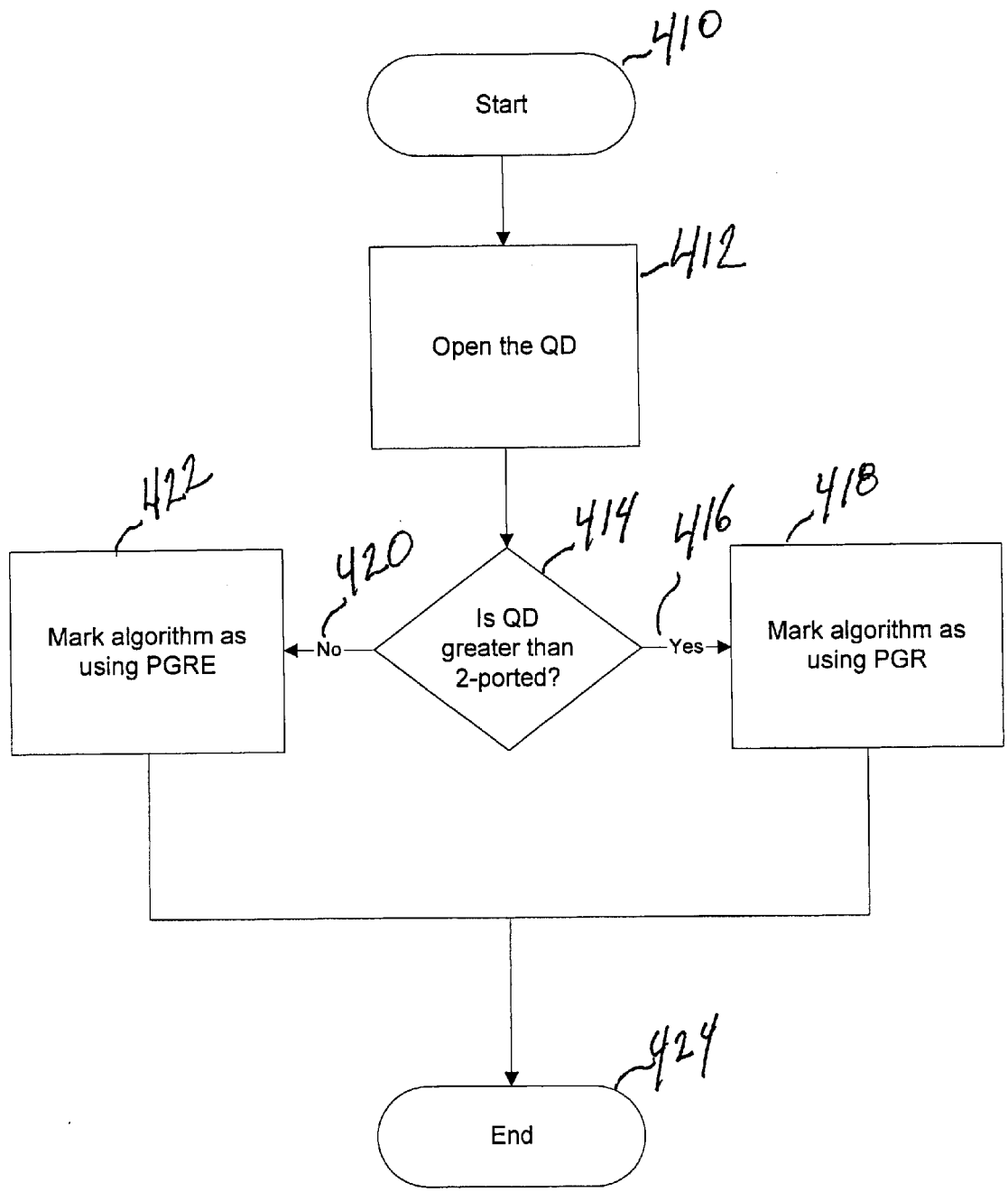
FIG. 4 is a flow chart representation of a first preferred embodiment of the present invention where the system determines the nature of the attached device.

In this first embodiment of the present, a determination is first made regarding the nature of the quorum disk. Where the quorum disk is greater than two-ported, this first embodiment contemplates mandating disks which fully support persistent group reservations or PGR. Where the quorum disk is dual-ported, this embodiment enables persistent group reservation emulations or PGRE. This feature is shown at FIG. 4. Having reference to that figure, at system startup, 410, the quorum device is opened at 412. The quorum device is read as to type, and a determination is made at step 414 whether the quorum device has greater than two ports. In the event that a determination is made, at 416, that the quorum device or QD has greater than two ports, the software implementing the algorithm is marked as 418 to indicate that the QD is using PGR, and system execution ends at 424. In the event that a determination is made at 420 that the QD is dual-ported, the software implementing the algorithm is marked at 422 to indicate that the QD is using PGRE. System execution then ends at 424.

Figure 5:
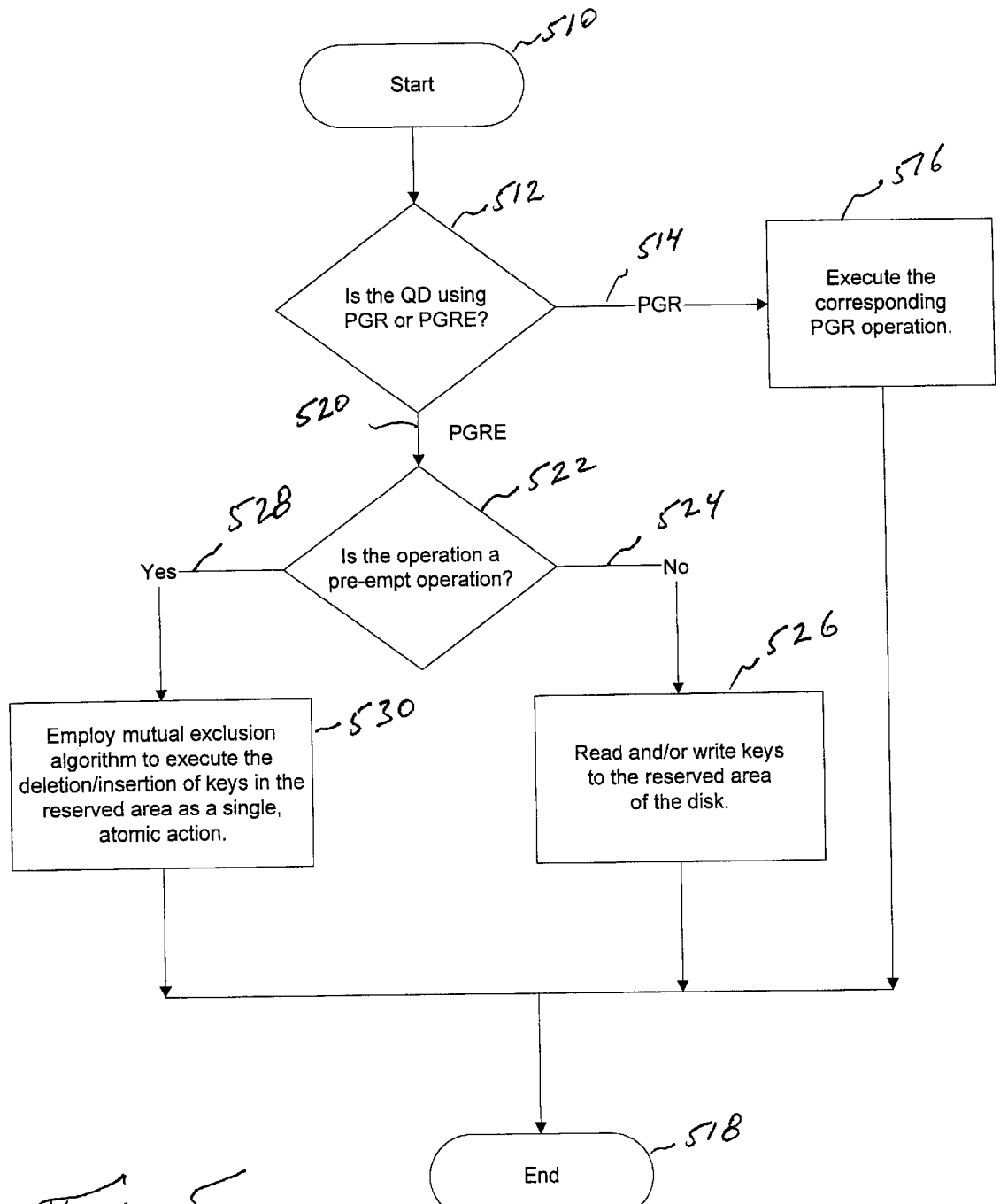
FIG. 5 is a flow chart representation of a first preferred embodiment of the present invention showing the operation of PGR and PGRE commands on the device.

Having reference to FIG. 5, any QD-related operation invoked by the cluster software is implemented as follows: at the start, 510, of the QD-related operation a determination is made at step 512 whether the QD is using PGR or PGRE. It will be recalled from the previous paragraph that this information has been marked on software implementing the algorithm. In the event, at 514, that the QD is determined to be using PGR, at step 516 the appropriate corresponding PGR operation is executed, and the operation terminates at 518. In the event, at 520, that a determination is made that the QD is using PGRE, a second determination is made, at 522, if the operation being conducted is a preempt operation. In the event that a determination is made, at 524, that the operation being executed is not a preempt, a key is written to, or read from the reserved area of the disk at 526, as previously explained, and the operation terminates at 518. In the event that the operation is determined, at 528, to be a preempt operation the deletion and/or insertion of keys in the reserved area of the disk is executed as a single, atomic action, at 530, and operation execution is terminated at 518.

While the preceding detailed description of one preferred embodiment of the present invention has centered on an embodiment implementing PGREs to effect a quorum algorithm, study of the teachings herein will render apparent to those having skill in the art that these teachings are applicable to a wide variety of hitherto PGR-dependent processes. The present invention specifically contemplates all such alternative implementations of the PGRE features taught or suggested herein.

Moreover, one embodiment discussed above has focused on a cluster implementing quorum devices that are dual-ported, and the particular problems attendant therewith. Again, study of the principles enumerated herein will render apparent to those having skill in the art that these principles may, with facility, be implemented on a wide variety of cluster configurations. In particular, the principles enumerated herein specifically contemplate the implementation hereof on clusters having substantially any number of nodes, where PGR emulation is beneficial.

Finally, while the present invention has occasionally been discussed in the context of providing emulations for SCSI-3 persistent group reservation features, study of the principles enumerated herein by those having skill in the art will render apparent that the present invention may be utilized in a wide variety of computational problems requiring the emulation of persistent group reservation features. The principles of the present invention specifically contemplate all such applications.

The present invention has been particularly shown and described with respect to certain preferred embodiments of features thereof. However, it should be readily apparent to those of ordinary skill in the art that various changes and modifications in form and detail may be made without departing from the spirit and scope of the invention as set forth in the appended claims. Each of these alternatives is specifically contemplated by the principles of the present invention.

What is claimed is:

1. A method for emulating a persistent group reservation feature on a non-persistent group reservation-compliant device implemented in a distributed computing system including at least one node, the method comprising the steps of:
    storing persistent group reservation emulation data on a portion of the device; and
    utilizing the persistent group reservation emulation data, emulating the function of at least one persistent group reservation feature.

2. The method of claim 1, wherein the persistent group reservation emulation data includes node-specific information and group reservation data, the method comprising the further steps of:
    reserving a first portion of the device;
    reserving a second portion of the device;
    storing node-specific information on the first portion of the device;
    storing group reservation data on the second portion of the device; and
    utilizing at least one of the node-specific information and the group reservation data, emulating the function of at least one persistent group reservation feature.

3. The method of claim 2 wherein the non-persistent group reservation-compliant device is an information storage disk having a section of the disk reserved for operating system functions, the method comprising the further steps of:

reserving a first portion of the disk within the section of the disk reserved for operating system functions;

reserving a second portion of the disk within the section of the disk reserved for operating system functions;

storing node-specific information on the first portion of the disk; and storing group reservation data on the second portion of the disk.

4. The method of claim 2 further directed to a distributed computing system including a plurality of nodes, the method comprising the further step of reserving a separate reserved portion of the device for each node in the plurality of nodes.

5. The method of claim 2 comprising the further step of selecting the persistent group reservation feature to be emulated from the group consisting of: storing a node reservation key on the device firmware; reading all node keys stored on the device firmware; preempting the reservation key of another node from being placed on the device firmware; placing a group reservation on the device firmware for all registered nodes; and reading a group reservation from the device firmware.

6. The method of claim 4 directed to emulating the persistent group reservation which stores the reservation key for a specified node in device firmware, the method comprising the further steps of:

accessing the specified node's reserved portion of the device; and storing a reservation key for the specified node on the specified node's reserved portion of the device.

7. The method of claim 2 directed to emulating a persistent group reservation which reads the reservation key for a node in device firmware, the method comprising the further steps of:

accessing the node's reserved portion of the device; and reading a reservation key for the node on the node's reserved portion of the device.

8. For a cluster implementing a plurality of nodes, the method of claim 2 directed to emulating the persistent group reservation which stores, in device firmware, group reservation data for the registered nodes of the cluster, the method comprising the further steps of:

accessing the portion of the device reserved for group reservation data; and storing group reservation data for the registered nodes of the cluster on the portion of the device reserved for group reservation data.

9. For a cluster implementing a plurality of nodes, the method of claim 2 directed to emulating the persistent group reservation which reads, from device firmware, group reservation data for the registered nodes of the cluster, the method comprising the further steps of:

accessing the portion of the device reserved for group reservation data; and reading group reservation data for the registered nodes of the cluster from the portion of the device reserved for group reservation data.

10. For a cluster implementing a plurality of nodes, the method of claim 6 directed to emulating the persistent group reservation which preempts, for a first node, the reservation key of a second node from being placed on the device firmware, the method comprising the further steps of:

accessing the portion of the device reserved for the node-specific data of each node in the plurality of nodes;

removing the registration key of each of the plurality of nodes other than the first node, thereby locking any of the plurality of nodes from removing the registration key of the first node.

11. The method of claim 10 further comprising the further steps, prior to the accessing step, of:

determining if the first node's reservation key is present in its respective reserved portion of the device; and responsive to a determination, by the determining step, that the first node's reservation key is present in its respective reserved portion of the device, proceeding to the accessing step; and responsive to a determination, by the determining step, that the first node's reservation key is not present in its respective reserved portion of the device, precluding the first node from removing the registration key of any node.

12. The method of claim 1 further for emulating a SCSI persistent group reservation feature, wherein the emulating step further comprises emulating the function of at least one SCSI persistent group reservation feature.

13. The method of claim 12 further for emulating a SCSI-3 persistent group reservation feature, wherein the emulating step further comprises emulating the function of at least one SCSI-3 persistent group reservation feature.

14. A computer readable storage medium storing instructions that, when read and executed by a computer, cause the computer to perform a method for method for emulating a persistent group reservation feature on a non-persistent group reservation-compliant device implemented in a distributed computing system including at least one node, the method comprising the steps of:

storing persistent group reservation emulation data on a portion of the device; and utilizing the persistent group reservation emulation data, emulating the function of at least one persistent group reservation feature.

15. The computer readable storage medium of claim 14, wherein the persistent group reservation emulation data includes node-specific information and group reservation data, the method comprising the further steps of:

reserving a first portion of the device;

reserving a second portion of the device;

storing node-specific information on the first portion of the device;

storing group reservation data on the second portion of the device; and utilizing at least one of the node-specific information and the group reservation data, emulating the function of at least one persistent group reservation feature.

16. The computer readable storage medium of claim 15 wherein the non-persistent group reservation-compliant device is an information storage disk having a section of the disk reserved for operating system functions, the method comprising the further steps of:

reserving a first portion of the disk within the section of the disk reserved for operating system functions;

reserving a second portion of the disk within the section of the disk reserved for operating system functions;

storing node-specific information on the first portion of the disk; and storing group reservation data on the second portion of the disk.

17. The computer readable storage medium of claim 15 further directed to a distributed computing system including a plurality of nodes, the method comprising the further step of reserving a separate reserved portion of the device for each node in the plurality of nodes.

18. The computer readable storage medium of claim 15 comprising the further step of selecting the persistent group reservation feature to be emulated from the group consisting of: storing a node reservation key on the device firmware; reading all node keys stored on the device firmware; pre-empting the reservation key of another node from being placed on the device firmware; placing a group reservation on the device firmware for all registered nodes; and reading a group reservation from the device firmware.

19. The computer readable storage medium of claim 17 further directed to emulating the persistent group reservation which stores the reservation key for a specified node in device firmware, the method comprising the further steps of:
   accessing the specified node's reserved portion of the device; and
   storing a reservation key for the specified node on the specified node's reserved portion of the device.

20. The computer readable storage medium of claim 15 further directed to emulating a persistent group reservation which reads the reservation key for a node in device firmware, the method comprising the further steps of:
   accessing the specified node's reserved portion of the device; and
   reading a reservation key for the specified node on the specified node's reserved portion of the device.

21. For a cluster implementing a plurality of nodes, the computer readable storage medium of claim 15 further directed to emulating the persistent group reservation which stores, in device firmware, group reservation data for the registered nodes of the cluster, the method comprising the further steps of:
   accessing the portion of the device reserved for group reservation data; and
   storing group reservation data for the registered nodes of the cluster on the portion of the device reserved for group reservation data.

22. For a cluster implementing a plurality of nodes, the computer readable storage medium of claim 15 further directed to emulating the persistent group reservation which reads, from device firmware, group reservation data for the registered nodes of the cluster, the method comprising the further steps of:
   accessing the portion of the device reserved for group reservation data; and
   reading group reservation data for the registered nodes of the cluster from the portion of the device reserved for group reservation data.

23. For a cluster implementing a plurality of nodes, the computer readable storage medium of claim 19 further directed to emulating the persistent group reservation which preempts, for a first node, the reservation key of a second node from being placed on the device firmware, the method comprising the further steps of:
   accessing the portion of the device reserved for the node-specific data of each node in the plurality of nodes; and
   removing the registration key of each of the plurality of nodes other than the first node, thereby locking any of the plurality of nodes from removing the registration key of the first node.

24. The computer readable storage medium of claim 23 comprising the further steps, prior to the accessing step, of:
   determining if the first node's reservation key is present in its respective reserved portion of the device;
   responsive to a determination, by the determining step, that the first node's reservation key is present in its respective reserved portion of the device, proceeding to the accessing step; and
   responsive to a determination, by the determining step, that the first node's reservation key is not present in its respective reserved portion of the device, precluding the first node from removing the registration key of any node.

25. The computer readable storage medium of claim 14 further for emulating a SCSI persistent group reservation feature, wherein the emulating step further comprises emulating the function of at least one SCSI persistent group reservation feature.

26. The computer readable storage medium of claim 25 further for emulating a SCSI-3 persistent group reservation feature, wherein the emulating step further comprises emulating the function of at least one SCSI-3 persistent group reservation feature.

27. Apparatus for emulating a persistent group reservation feature on a non-persistent group reservation-compliant device implemented in a distributed computing system including at least one node, the apparatus comprising:
   a portion of the device having persistent group reservation emulation data stored thereon; and
   a program for emulating of at least one persistent group reservation feature utilizing the persistent group reservation emulation data stored on the portion of the device.

28. The apparatus of claim 27, wherein the persistent group reservation emulation data includes node-specific information and group reservation data, the further comprising:
   a first reserved portion of the device;
   a second reserved portion of the device; and
   the program further for
      (1) storing node-specific information on the first reserved portion of the device,
      (2) storing group reservation data on the second reserved portion of the device, and for
      (3) utilizing at least one of the node-specific information and the group reservation data, emulating the function of at least one persistent group reservation feature.

29. The apparatus of claim 28 wherein the non-persistent group reservation-compliant device is an information storage disk having a section of the disk reserved for operating system functions, the further apparatus comprising:
   a first reserved portion of the disk within the section of the disk reserved for operating system functions;
   a second reserved portion of the disk within the section of the disk reserved for operating system functions; and
   the program further for
      (1) storing node-specific information on the first reserved portion of the disk, and for
      (2) storing group reservation data on the second reserved portion of the disk.

30. The apparatus of claim 28 further directed to a distributed computing system including a plurality of nodes, the device further comprising a separate reserved portion of the device for each node in the plurality of nodes.

31. The apparatus of claim 28 wherein the program is further for selecting the persistent group reservation feature to be emulated from the group consisting of: storing a node reservation key on the device firmware; reading all node keys stored on the device firmware; preempting the reservation key of another node from being placed on the device firmware; placing a group reservation on the device firmware for all registered nodes; and reading a group reservation from the device firmware.

32. The apparatus of claim 27 further for emulating a SCSI persistent group reservation feature, wherein the program is configured to emulate the function of at least one SCSI persistent group reservation feature.

33. The apparatus of claim 32 further for emulating a SCSI-3 persistent group reservation feature, wherein the program is configured to emulate the function of at least one SCSI-3 persistent group reservation feature.

* * * * *